(12) United States Patent
Lee et al.

(10) Patent No.: US 8,363,920 B2
(45) Date of Patent: Jan. 29, 2013

(54) CHEQUE RECOGNITION DEVICE AND METHOD

(75) Inventors: Woo Ho Lee, Seoul (KR); Jae Hoon Kwak, Anyang-si (KR); Jin Yong Hwang, Seoul (KR); Hee Chang Lee, Suwon-si (KR)

(73) Assignee: Nautilus Hyosung Inc., Seoul (KR)

( * ) Notice: Subject to any disclaimer, the term of this patent is extended or adjusted under 35 U.S.C. 154(b) by 708 days.

(21) Appl. No.: 12/566,560

(22) Filed: Sep. 24, 2009

(65) Prior Publication Data

US 2010/0074510 A1   Mar. 25, 2010

(30) Foreign Application Priority Data

Sep. 25, 2008   (KR) .................. 10-2008-0094064

(51) Int. Cl.
 *G06K 9/00*   (2006.01)
(52) U.S. Cl. ......................................... 382/139; 705/45
(58) Field of Classification Search .................. 382/139, 382/140
See application file for complete search history.

(56) References Cited

U.S. PATENT DOCUMENTS

| | | | | |
|---|---|---|---|---|
| 5,602,936 A | * | 2/1997 | Green et al. | 382/140 |
| 2005/0015342 A1 | * | 1/2005 | Murata et al. | 705/45 |
| 2005/0091161 A1 | * | 4/2005 | Gustin et al. | 705/43 |

FOREIGN PATENT DOCUMENTS

| KR | 10-0323904 | 2/2002 |
|---|---|---|
| KR | 10-0613889 | 8/2006 |

\* cited by examiner

*Primary Examiner* — Hadi Akhavannik
(74) *Attorney, Agent, or Firm* — Fenwick & West LLP

(57) ABSTRACT

A cheque recognition device includes a magnetic ink character recognition unit disposed on a cheque moving path along which an introduced cheque is transferred such that it can recognize a magnetic ink character printed on the cheque headed for one side of the cheque moving path; and a control unit for analyzing the magnetic ink character recognized in the magnetic ink character recognition unit to verify whether or not the cheque is normal.

2 Claims, 5 Drawing Sheets

CHEQUE RECOGNITION DEVICE AND METHOD

FIELD OF THE INVENTION

The present invention relates to an automated teller machine (ATM) capable of conducting smoothly a banking service, and more particularly, to a cheque recognition device in an ATM capable of recognizing a magnetic ink character on a cheque regardless of an introduction direction of the cheque and a size of the cheque.

BACKGROUND OF THE INVENTION

An automated teller machine (ATM) regarding a financial service is an automated device which is capable of assisting a basic financial service such as a receipt and payment without a bank clerk at any place and any time. The ATM is constructed such that a financial transaction such as a payment or a deposition of the cash or cheque can be automatically performed through a medium such as a card or a bankbook. Accordingly, the bank clerk as well as the customer can handle easily the ATM. The ATM, which is mostly installed in a store such as a department store, a supermarket and the like can be operated after completing a business hours of the bank without an operator or manager. In view of the above, the utilization of the ATM has been increased gradually, and an efficiency of the ATM together with the efficient disposition and a rationalization of employees becomes an important task in the financial institutions such as a bank. In particular, the ATM is conceived for the customer to deposit or draw easily and rapidly a cheque without resort to the intervention of a bank window.

Hereinafter, a process for recognizing a cheque is illustrated with reference to the drawings. FIGS. 1A and 1B are schematic views showing cheques on which magnetic ink characters are printed, respectively; and FIGS. 2A to 2D are schematic views illustrating that the cheques are introduced in four introduction directions which differ from one another, respectively.

As shown in FIGS. 1A and 1B, cheques C1 and C2 have magnetic ink characters N1 and N2 printed on lower portions of front surfaces thereof which represent the cheque's own information such as a cheque number, a serial number and the like. Also, the cheques C1 and C2 have the various sizes corresponding to a standard in all countries of the world. In general, the magnetic ink characters N1 and N2 are spaced apart from lower ends of the cheques C1 and C2 by certain distances H1 and H2, respectively, depending on the size of the cheques.

The ATM is provided with a cheque recognition device installed therein for recognizing the information of the magnetic ink character printed on the cheque to distinguish an abnormal cheque having the ambiguous information and a forged cheque from a normal cheque. In general, the recognition of the magnetic ink character may be achieved by an optical character recognition (OCR) and a magnetic ink character recognition (MICR).

The optical character recognition (OCR) utilizes a contact image sensor (CIS) which scans the cheque to obtain an image of the cheque. In the OCR, a light is irradiated on a magnetic ink character on a front surface of the cheque, and an image of the magnetic ink character is obtained from a light reflected from the magnetic ink character. The magnetic ink character image is then compared with a reference character image stored in a memory device to recognize the magnetic ink character printed on the cheque.

A magnetic ink character recognition (MICR) employs a character recognition device utilizing a magnetized component of a magnetic ink character. The character recognition device is provided with a magnetic unit for magnetizing a magnetic ink printed on a cheque and a magnetic head for recognizing the information of the magnetized magnetic ink. In the character recognition device, the cheque introduced by the user is passed sequentially through the magnetic unit and the magnetic head so that the cheque is recognized.

As described above, after performing the optical character recognition (OCR) process or the magnetic ink character recognition (MICR) process, it is determined whether to receive normally the cheque or to reject the cheque, and an endorsement to the cheque is then carried out. The endorsement means that the rights relating to the cheque are transferred from the user to the bank. Examples of items endorsed include a depositing date, a depositing amount and bank information.

In a cheque recognition device of a prior art, an OCR device or an MICR device is provided at only one side, e.g., a right side of a cheque moving path, in order to recognize the magnetic character on the cheque. Therefore, it is possible to recognize only a cheque introduced in a state where a back surface of the cheque is directed to a bottom and a lower end of the cheque is directed to the right side of the cheque moving path (see FIG. 2A). However, if the cheque is introduced in a state where a back surface of the cheque is directed to a bottom, but a lower end of the cheque is directed to an opposite side to the right side (see FIG. 2B); in a state where a front surface of the cheque is directed to a bottom and a lower end of the cheque is directed to the right side (see FIG. 2C); and in a state where a front surface of the cheque is directed to a bottom and a lower end of the cheque is directed to an opposite side to the right side (see FIG. 2D), it is impossible to recognize the magnetic ink character, which results in that a receipt of the cheque is rejected. In order to avoid the above inconvenience, the user should pay close attention to introduce the cheque.

In addition, in a case where separate cheques have different sizes, it is difficult for the check recognition device to exactly recognize the magnetic ink characters printed on the cheques since the distances H1 and H2 are different from one another. Also, if the cheques are introduced by the bundle, the user should strive to align exactly the direction of all the cheques.

SUMMARY OF THE INVENTION

It is, therefore, an object of the present invention to provide a cheque recognition device capable of recognizing a magnetic ink character on a cheque regardless of a size of the cheque although the cheque is introduced in a state where a back surface is directed to a bottom, in a state where a front surface is directed to a bottom, and in a state reversed between lower and upper ends.

In accordance with an aspect of the present invention, there is provided a cheque recognition device, which includes:

a magnetic ink character recognition unit disposed on a cheque moving path along which an introduced cheque is transferred such that it recognizes a magnetic ink character printed on the cheque headed for either side of the cheque moving path; and a control unit for analyzing the magnetic ink character recognized in the magnetic ink character recognition unit to verify whether or not the cheque is normal.

In accordance with another aspect of the present invention, there is provided a method for recognizing a cheque being transferred along a cheque moving path, which includes:

recognizing a magnetic ink character on the cheque headed for either side of the cheque moving path; and analyzing the recognized magnetic ink character to verify whether or not the cheque is normal.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, exemplary embodiments of the present invention will be described in detail with reference to the accompanying drawings so that they can be readily implemented by those skilled in the art. In the below description, if a detail description on well-known structure and function related to the present invention makes a gist of the present unclear, this description will be omitted.

Figure 3:
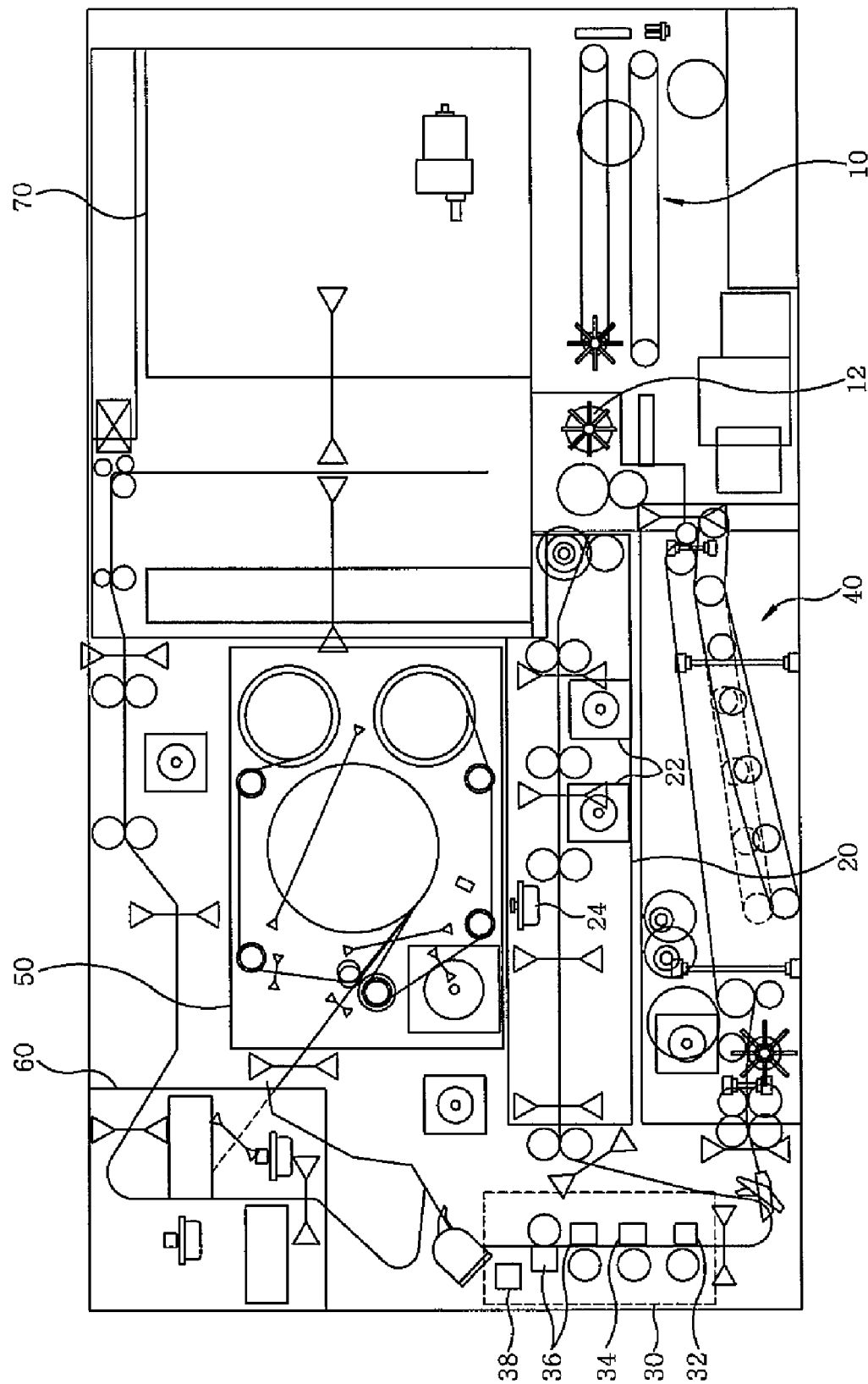
FIG. 3 is a schematic view illustrating an automated teller machine (ATM) provided with a cheque recognition device in accordance with an embodiment of the present invention.

FIG. 3 is a schematic view illustrating an automated teller machine (ATM) provided with a cheque recognition device in accordance with an embodiment of the present invention.

Referring to FIG. 3, an introduction unit 10 receives a cheque or a bundle of cheques introduced by the user or takes returned from the ATM. The introduction unit 10 may include an introduction box in which the introduced or returned cheques are placed and opening/closing door for opening/closing the introduction box.

A bundle separation unit 12 serves to separate the bundle of cheques introduced through the introduction unit 10 on a leaf-by-leaf basis and transfer the cheque separated from one another at regular time interval.

An alignment module 20 aligns the cheques transferred from the introduction unit 10 to allow the cheques to be moved normally in a subsequent process. The alignment module 20 includes a one-side alignment unit 22 and a plural cheque leaves detector 24.

The one-side alignment unit 22 aligns rapidly and accurately the cheques on one side of a cheque moving path while transferring continuously the cheque over a predetermined interval. Subsequently, a character recognition module 30 performs an accurate recognition process for the aligned cheques and an endorsement printing unit 60 performs a printing process on a determined position of the cheque.

If the cheque is transferred in a state where two or more leaves of cheques are overlapped one above another, it is impossible to perform an accurate check-depositing process for these cheques. The plural cheque leaves detector 24 serves to detect two or more overlapped cheque leaves being transferred. Preferably, the plural cheque leaves detector 24 may be implemented as a mechanical detection manner which senses a thickness of the cheque leaves and verifies whether two or more overlapped cheque leaves are transferred or not, and may be implemented by using a hall sensor or a laser. For example, the plural cheque leaves detector is disclosed in U.S. patent application Ser. No. 11/475,138 filed on Jun. 27, 2006 and assigned to the present Applicant, which is incorporate herein by reference in its entirety.

The character recognition module 30 detects whether or not the cheque is in a normal state, e.g., whether the cheque is a genuine cheque or a forged cheque and whether the cheque is damaged or not. The character recognition module 30 includes a magnetic ink character recognition (MICR) unit 32 for obtaining cheque information such as a magnetic ink character printed on the cheque; a scanner 36 comprised of a contact image sensor (CIS) for scanning both surfaces of the cheque to obtain media information such as an image of the cheque; a magneto resistive (MR) array 34 for detecting a location of the magnetic ink character; and a control unit 38 for analyzing the magnetic ink character recognized in the MICR unit 32 and analyzing information at the detected location of the magnetic ink character within the cheque image obtained by the scanner 36.

After determining whether the cheque is in the normal state or not and analyzing the cheque image through the character recognition module 30, a selective cheque moving path conversion is performed under a control of the control unit 38 between a cheque moving path through which the cheque verified as an abnormal cheque will be transferred and a cheque moving path through which the cheque verified as a normal cheque is continuously transferred. That is, when the cheque is passed through the character recognition module 30, a normal state or an abnormal state of the cheque is verified. As a verification result, the abnormal cheque is returned to a returning unit 40 and the normal cheque is continuously conveyed to a temporary standby unit 50.

Until a verification process for all the cheques introduced through the introduction part 10 is completed, the cheques identified as the abnormal cheque are continuously received and temporarily stored in the returning unit 40. Subsequently, once the verification process for all the introduced cheques is completed, the abnormal cheques are returned to the introduction part 10.

A movement of the cheque verified as the normal cheque by the character recognition module 30 is temporarily halted and stayed in the temporary standby unit 50. To be specific, prior to printing an endorsement that a property to the cheque is transferred to a banking facility, the cheque is finally stayed in the temporary standby unit 50 in order to receive a confirmation from a customer who is a cheque owner. If a command asks for depositing the cheque, the cheque is continuously moved to the endorsement printing unit 60. On the contrary, if a command to return the cheque is instructed, the cheque is returned to the introduction unit 10 through the returning unit 40.

In the meantime, in only a case where, as a verification result obtained by the character recognition module 30, the cheque is verified as the normal one and an owner's ultimate depositing command is instructed, the endorsement printing unit 60 performs ultimately a printing process for an endorsement indicating a property transference on the corresponding cheque under the control of the control unit 38.

The cheque subjected to the endorsement is then moved to a storage unit 70 in which a plurality of normal cheques ultimately stored.

Figure 4:
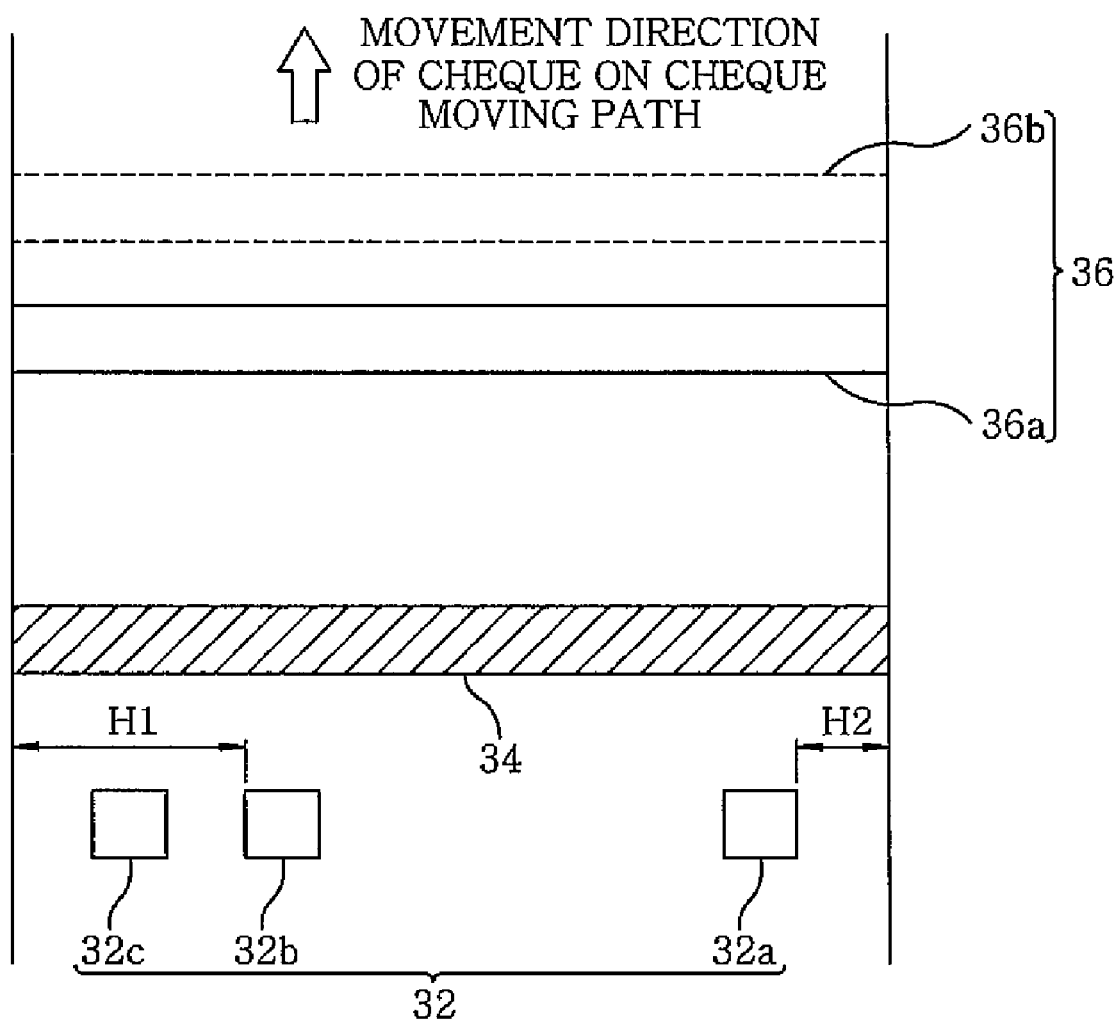
FIG. 4 is a schematic view illustrating an arrangement of the cheque recognition device shown in FIG. 3.

FIG. 4 is a schematic view illustrating an arrangement of the cheque recognition device in accordance with the present invention.

In order to recognize the magnetic ink character printed on the cheque, the cheque should be passed and aligned on one side of the cheque moving path through the alignment unit 20.

The MICR unit 32 obtains the cheque information from the magnetic character printed on the cheque, and includes a first magnetic recognition head 32a for scanning the cheque introduced in a forward direction in which the magnetic ink character is headed for a right side of the cheque moving path; second and third magnetic recognition heads 32b and 32c for scanning the cheque introduced in a turned direction in which the magnetic ink character is headed for an opposite side (i.e., a left side) to the right side of the cheque moving path. In other words, the check has the magnetic character representing the cheque information such as a serial number, the name of bank and an account number related to an issuance on a lower portion of the cheque. Accordingly, the MICR unit 32 is disposed on a right or left side of the cheque moving path such that it recognizes the magnetic ink character headed for the right or left side of the cheque moving path to obtain the cheque information. The obtained cheque information is utilized for verifying whether the cheque is a genuine cheque or a forged cheque. The MICR unit 32 may further include a pressurizing unit for allowing the cheque to be in contact with the magnetic recognition heads to obtain an accurate recognition of the magnetic ink character.

According to the present invention, the MICR unit 32 can recognize the magnetic ink character on a front surface of the cheque although the cheque is introduced in a state where the front surface is directed to a bottom.

Figure 2A:
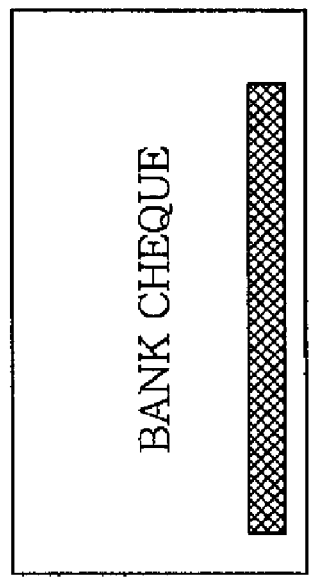
FIGS. 2A to 2D are schematic views illustrating that cheques are introduced in four introduction directions, respectively.
Figure 2B:
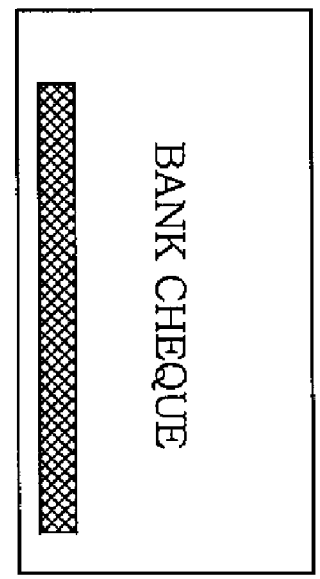
Figure 2C:
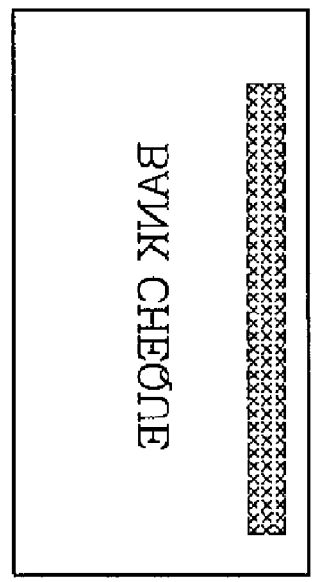
Figure 2D:
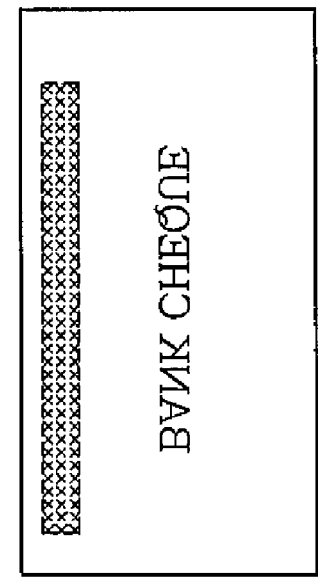

The first magnetic recognition head 32a is disposed at one side of the moving path, e.g., a right side of the moving path and recognizes the magnetic ink character printed on a front surface of the cheque introduced in a state in which a back surface of the cheque is directed to a bottom and the magnetic ink character or a lower end of the cheque is headed for the right side of the cheque moving path (see, FIG. 2A) or in a state in which the front surface of the cheque is directed to a bottom and the magnetic ink character or a lower end of the cheque is headed for the right side of the cheque moving path (see, FIG. 2C). The second magnetic recognition head 32c is disposed at an opposite side to the first magnetic recognition head 32a and recognizes the magnetic character printed on a front surface of the cheque introduced in a state in which a back surface of the cheque is directed to a bottom and the magnetic ink character or a lower end of the cheque is headed for the left side of the cheque moving path (see, FIG. 2B), or in a state in which a front surface of the cheque is directed to a bottom and the magnetic ink character or a lower end of the cheque is headed for the left side of the cheque moving path (see, FIG. 2D).

Figure 1A:
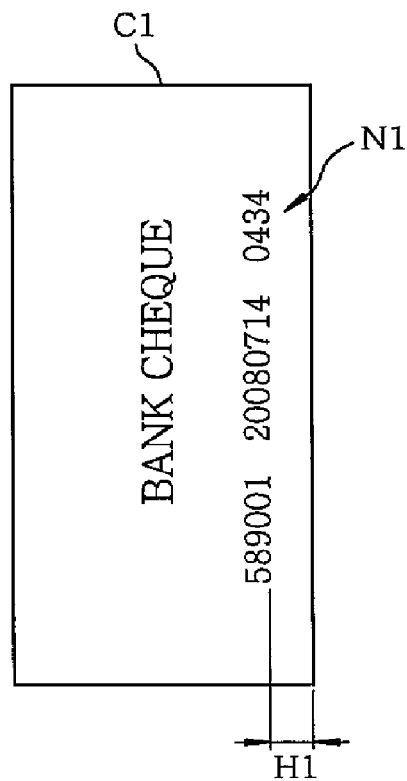
FIGS. 1A and 1B are schematic views showing cheques on which magnetic ink characters are printed, respectively.
Figure 1B:
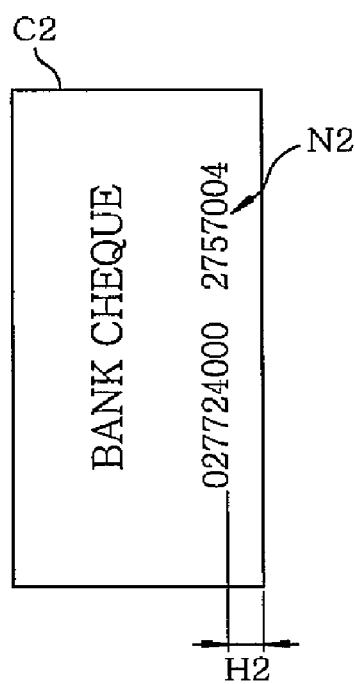

In the mean time, the third magnetic recognition head 32b is disposed at the left side of the cheque moving path and spaced apart from the second recognition head 32c. Therefore, the third magnetic recognition head 32c recognizes the magnetic character printed on a front surface of a large-sized cheque C1 of FIG. 1A, which is different from the check C2 of FIG. 1B in size, introduced in a state in which a back surface of the cheque is directed to a bottom and the magnetic ink character or a lower end of the cheque is headed for the left side of the cheque moving path (see, FIG. 2B), or in a state in which a front surface of the cheque is directed to a bottom and the magnetic ink character or a lower end of the cheque is headed for the left side of the cheque moving path (see, FIG. 2D).

Alternatively, the third magnetic recognition head 32b may be disposed at the right side of the cheque moving path and spaced apart from the first recognition head 32a. In this case, the third magnetic recognition head 32b can recognize the magnetic ink character printed on a front surface of the cheque introduced in a state in which a back surface of the cheque is directed to a bottom and the magnetic ink character or a lower end of the cheque is headed for the right side of the cheque moving path (see, FIG. 2A), or in a state in which the front surface of the cheque is directed to a bottom and the magnetic ink character or a lower end of the cheque is headed for the right side of the cheque moving path (see, FIG. 2C). Each of the magnetic characters obtained by three magnetic recognition heads 32a, 32b and 32c is analyzed in the control unit 38.

Accordingly, regardless of an introduction state of the cheque and a size of the cheque, the magnetic ink character on the cheque can be read by the MICR unit 32. The MICR unit 32 may be provided with another magnetic recognition heads depending on different sizes of the cheques. For example, in a case where the cheque recognition device of the present invention recognizes four different sizes of the cheques, a fourth magnetic recognition heads can be disposed on the cheque moving path such that they recognize the magnetic ink characters of the different-sized cheques.

The MR array 34 functions to detect a location where the magnetic ink character is printed on the cheque. The MR array 34 may include plural MR heads and a pressurizing unit for allowing the cheque to be in contact with the MR heads to perform an accurate recognition. The information on the location of the magnetic ink character detected in the MR array 34 is then provided to the control unit 38.

The scanner 36 scans continuously both surfaces of the cheque on the cheque moving path to obtain the cheque image as the medium information. The cheque image obtained by the scanner 36 is provided to the control unit 38 and then analyzed by an OCR (optical character recognition) algorithm installed in the control unit 38. The scanner 36 includes two scanning heads 36a and 36b which are arranged across the cheque moving path to scan front and back surfaces of the cheque. The scanner 36 may further include a pressurizing unit for allowing the scanning heads 36a and 36b to be in close contact with the cheque to perform an accurate scanning process.

The control unit 38 analyzes the information such as character or figure from the cheque image obtained by the scanner 36. That is, the control unit 38 analyzes information existing at the location of the magnetic character detected by the MR array 34 within the cheque image obtained by the scanner 36.

Therefore, even though the MICR unit 32 fails to recognize the magnetic ink character, the MR array 34 detect the location where the magnetic ink character is printed on the cheque and the control unit 38 analyzes only region on the cheque image scanned by the scanner 36 corresponding to the detected position of the magnetic ink character, which results in a rapid recognition of the magnetic ink character.

Further, the control unit 38 may verify a size of the cheque and judge whether or not the cheque is damaged on based on the cheque image obtained by the scanner 36. In addition, the control unit 38 may obtain the appearance information as well as the additional information such as the amount of the cheque. As occasion demands, the control unit 38 may count a plurality of cheques passed through the scanner 36 in view of the number of scanning The additional information analyzed by the control unit 38 may be utilized for reviewing the customer. In this embodiment, it has been shown and described that the scanner 36 is arranged at an upstream of the MICR unit 32 on the cheque moving path. However, it will be appreciated to those skilled in the art that the MICR unit 32, the MR array 34 and the scanner 36 may be arbitrarily arranged on the cheque moving path. Further, the scanning heads 36a and 36b of the scanner 36 may designed to scan an entire region of the cheque or some region of the cheque on the basis of the position information detected in the MR array 34.

According to the present invention, the MR array 34 may be selectively operated under the control of the control unit 38. In a case where the magnetic ink character on the cheque is perfectly recognized by the MICR unit 32, the control unit 38 may prevent the MR array 34 from being operated. However, although the magnetic ink character is completely recognized by the MICR unit 32, the MR array 34 is permitted by the control unit 38 to operate. In this case, the position information of the magnetic ink character is stored in a storage unit (not shown) and utilized to analyze a location of the magnetic ink character using the OCR algorithm, if necessary.

The operation of the cheque recognition device of the present invention having the above structure is disclosed as follows.

First, the opening/closing door of the introduction unit 10 is opened, and the user introduces the cheques to be deposited, by a bundle unit at a time. Then, the opening/closing door of the introduction unit 10 is closed, and the bundle separation unit 12 is subsequently operated to separate the cheques at regular time intervals and then discharge the cheques continuously on a leaf-by-leaf basis. The discharged cheque is moved to the alignment unit 20. Subsequently, while passing through the one-side alignment means 22, the cheque is aligned on one side of the cheque moving path, and the plural cheque leaves detector 24 detects two or more cheque leaves overlapped one above another. Then, the cheque is continuously transferred and passed through the character recognition unit 30. The determination on whether the cheque is in a normal state or not is achieved through the character recognition unit 30. As a result of the process for verifying whether the cheque is in the normal state or not, the cheque which is verified as a abnormal cheque is returned through the returning unit 40 and the introduction unit 10, and the cheque which is verified as a normal cheque is ultimately transferred to the storage unit 70 through the temporary standby unit 50 and the endorsement printing unit 60.

Figure 5:
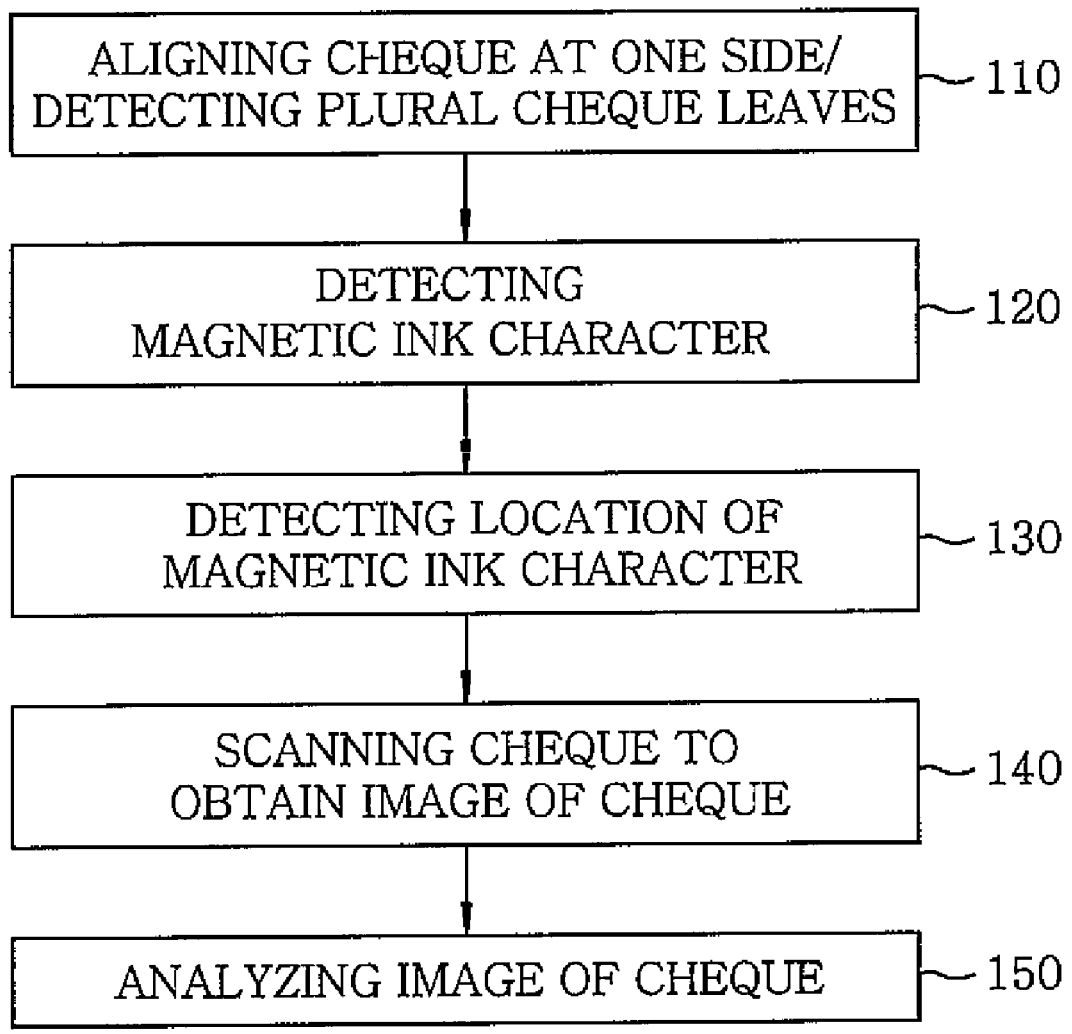
FIG. 5 is a flow chart illustrating a method for recognizing magnetic ink characters on cheques whose sizes differ from one another.

FIG. 5 is a flow chart illustrating a method for recognizing a magnetic ink character on the cheque regardless of a size and introduction direction of the cheque.

A method for recognizing the magnetic ink character on the cheque includes step 120 of detecting the magnetic ink character on the cheque through the respective magnetic recognition heads 32a, 32b and 32c disposed on the cheque moving path such that they recognizes the magnetic ink character on the cheque; step 130 of detecting a location of the magnetic ink character on the cheque, through the use of the MR array 34; step 140 of scanning the cheque through the scanner 36 to obtain an image of the cheque; and step 150 of analyzing information on the position of the magnetic ink character detected by the MR array 34 within the cheque image scanned by the scanner 36. In the meantime, in order to recognize accurately the magnetic ink character, step 110 of aligning the cheque to one side on the cheque moving path and detecting whether two more overlapped cheque leaves are existed or not is performed in advance.

The step 130 of detecting the location of the magnetic ink character printed on the cheque and the step 150 of analyzing the information on the detected position from the cheque image may be optionally carried-out. The optional execution of the step 130 and the step 150 is adjusted by the control unit depending on the result in the step 120. That is, if the cheque is completely recognized in the step 120, the method for recognizing the magnetic ink character on the cheque is finished without carrying out the step 130 and the step 150.

According to the present invention, in a case where a cheque whose back surface is directed to a bottom or front surface is directed to a bottom is introduced, and in a case where a cheque is introduced in a turned state between right and left side of the cheque, the magnetic ink character on the cheque can be recognized, and so it is possible to alleviate the need for the user to align the introduction direction of the cheque at the time of depositing the cheque and to introduce rapidly the cheque.

While the invention has been shown and described with respect to the preferred embodiments, it will be understood by those skilled in the art that various changes and modifications may be made without departing from the scope of the invention as defined in the following claims.

What is claimed is:

1. A cheque recognition device comprising:
   a magnetic ink character recognition unit disposed on a cheque moving path along which an introduced cheque is transferred such that the magnetic ink character recognition unit recognizes a magnetic ink character printed on the cheque headed for either side of the cheque moving path, the magnetic ink character recognition unit comprising:
      a first magnetic recognition head disposed at one side of the cheque moving path to recognize the magnetic ink character on the cheque introduced in a state in which a back surface of the cheque is directed to a bottom and the magnetic ink character is headed for the one side of the cheque moving path, or in a state in which the front surface of the cheque is directed to a bottom and the magnetic ink character is headed for the one side of the cheque moving path;
      a second magnetic recognition head disposed at an opposite side of the cheque moving path to recognize the magnetic character on the cheque introduced in a state in which a back surface of the cheque is directed to a bottom and the magnetic ink character is headed for the other side of the cheque moving path, or in a state in which a front surface of the cheque is directed to a bottom and the magnetic ink character is headed for the other side of the cheque moving path; and
      a third magnetic recognition head disposed at either of the one side or the other side of the cheque moving path and spaced apart from the first or the second recognition head, such that the third magnetic recognition head recognizes the magnetic character on the cheque introduced in a state in which a front surface of the cheque is directed to a bottom and the magnetic ink character is headed for the one side of the cheque moving path, or in a state in which a back surface of the cheque is directed to a bottom and the magnetic ink character is headed for the other side of the cheque moving path, wherein the cheque recognized by the third magnetic recognition head is different from the cheque recognized by the first or the second magnetic recognition head in size; and
   a control unit for analyzing the magnetic ink character recognized in the magnetic ink character recognition unit to verify whether or not the cheque is normal.

2. The cheque recognition device of claim 1, further comprising a scanner for scanning the cheque to obtain a cheque image, wherein the control unit analyzes the magnetic ink character from the cheque image obtained by the scanner to verify whether or not the cheque is normal; and a magneto resistive array for detecting a location of the magnetic ink character printed on the cheque, wherein the control unit analyzes information at the location detected by the magneto resistive array within the cheque image obtained by the scanner to verify whether or not the cheque is normal.

* * * * *